United States Patent
Zehler (10) Patent No.: US 10,659,635 B1
(45) Date of Patent: May 19, 2020

(54) PROXY ENHANCED PROTOCOL SEMANTICS RECOGNITION

(71) Applicant: Xerox Corporation, Norwalk, CT (US)

(72) Inventor: Peter J. Zehler, Penfield, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/272,170

(22) Filed: Feb. 11, 2019

(51) Int. Cl.
G06F 3/12 (2006.01)
H04N 1/00 (2006.01)

(52) U.S. Cl.
CPC ....... *H04N 1/00503* (2013.01); *G06F 3/1203* (2013.01); *G06F 3/1244* (2013.01); *G06F 3/1289* (2013.01); *H04N 1/00244* (2013.01); *H04N 1/00509* (2013.01)

(58) Field of Classification Search
CPC .......... H04N 1/00503; H04N 1/00244; H04N 1/00509; G06F 3/1203; G06F 3/1244; G06F 3/1289
See application file for complete search history.

(56) References Cited

U.S. PATENT DOCUMENTS

| | | | |
|---|---|---|---|
| 7,440,126 B2 | 10/2008 | Hull et al. | |
| 8,224,796 B1 | 7/2012 | Shinde et al. | |
| 8,352,535 B2 | 1/2013 | Peled et al. | |
| 8,688,690 B2 | 4/2014 | Brdiczka et al. | |
| 9,146,953 B1 | 9/2015 | Hernacki et al. | |
| 9,237,170 B2 | 1/2016 | Kiang et al. | |
| 9,691,027 B1 | 6/2017 | Sawant et al. | |
| 2009/0174893 A1* | 7/2009 | Fujii | G03G 15/5029 358/1.15 |
| 2009/0201544 A1* | 8/2009 | Kumakura | H04N 1/32122 358/1.15 |
| 2010/0063972 A1* | 3/2010 | Fujii | G06Q 10/00 707/748 |
| 2014/0268236 A1* | 9/2014 | Ohara | G06F 3/1224 358/1.15 |
| 2016/0156484 A1* | 6/2016 | Matsuhara | H04L 12/4633 709/227 |
| 2016/0224288 A1* | 8/2016 | Nogawa | G06F 3/1236 |
| 2017/0230529 A1* | 8/2017 | Tachi | H04N 1/00204 |

* cited by examiner

*Primary Examiner* — Moustapha Diaby
(74) *Attorney, Agent, or Firm* — Fay Sharpe LLP (57) ABSTRACT

A proxy logger is a proxy or gateway between a Semantic Query/Certification tool and a Multifunction device, such as a multifunction printer. A user specifies the beginning and end points of a specific operation and the proxy logger records network requests and decrypts/encrypts the traffic. The proxy logger and SQCT logs the results for later consumption. Using this method the Semantic Query/Certification tool may generate a certification report or enumerate how a semantic operation is performed for different models of MFDs. The output of the log will be used to build device management profile for the MFD.

16 Claims, 4 Drawing Sheets

PROXY ENHANCED PROTOCOL SEMANTICS RECOGNITION

BACKGROUND

The subject disclosure is directed to the computer arts, computer network arts, device management arts, operational semantic arts, and the like.

Computer networks generally utilize a variety of different peripheral devices, e.g. printers, scanners, facsimile machines, all-in-one machines, etc. Typically, such networks have multifunction peripheral devices (MFDs) capable of performing several types of document processing and production services. These MFDs may be of one particular make and model, but commonly devices from different manufactures or different models from the same manufacturer are used. A problem facing the management of a heterogeneous fleet of multifunction devices (MFD) is that the specific protocol operations required to accomplish a task (e.g., disable a port, get usage counters) vary between MFDs.

The exact protocol sequence is often not explicitly available. It is often incorporated into management tools supplied by the MFD manufacturer. In other cases, the exact protocol sequence may be documented in proprietary, or public, specifications. There is an additional complexity to this in that the MFD firmware implementer may not strictly adhere to the specification. When workarounds for these deficiencies are found they may be either documented some other place or accommodated in an update to the management tool.

In other words, for networks comprising multiple and different devices, traditional device management systems are inefficient in managing those multiple devices due to the management system's dependence on separate device management tools (per each device). This is especially the case in performing maintenance on the network. A system and method for responding to these above-identified issues and integrating such a response into a single framework are needed.

There remains a need for a system and method for generating a device management profile.

INCORPORATION BY REFERENCE

The following references, the disclosures of which are incorporated herein by reference in their entirety, are mentioned:

U.S. Pat. No. 9,146,953, issued Sep. 29, 2015, entitled METHOD AND SYSTEM TO AUDIT PHYSICAL COPY DATA LEAKAGE, by Hernacki, et al.;

U.S. Pat. No. 9,237,170, issued Jan. 12, 2016, entitled DATA LOSS PREVENTION (DLP) METHODS AND ARCHITECTURES BY A CLOUD SERVICE, by Kiang, et al.;

U.S. Pat. No. 8,688,690, issued Apr. 1, 2014, entitled METHOD FOR CALCULATING SEMANTIC SIMILARITIES BETWEEN MESSAGES AND CONVERSATIONS BASED ON ENHANCED ENTITY EXTRACTON, by Brdiczka et al.;

U.S. Pat. No. 8,224,796, entitled SYSTEMS AND METHODS FOR PREVENTING DATA LOSS ON EXTERNAL DEVICES, by Shinde, et al.;

U.S. Pat. No. 7,440,126, issued Oct. 21, 2008, entitled PRINTER WITH DOCUMENT-TRIGGERED PROCESSING, by Hull, et al.;

U.S. Pat. No. 9,691,027, issued Jun. 27, 2017, entitled CONFIDENCE LEVEL THRESHOLD SELECTION ASSISTANCE FOR A DATA LOSS PREVENTION SYSTEM USING MACHINE LEARNING, by Sawant, et al.; and, U.S. Pat. No. 8,352,535, issued Jan. 8, 2013, entitled METHOD AND SYSTEM FOR MANAGING CONFIDENTIAL INFORMATION, by Peled, et al.

BRIEF DESCRIPTION

The present disclosure sets forth systems and methods for devices such as printers, copiers, scanners and multifunction devices (MFS).

Various details of the present disclosure are hereinafter summarized to provide a basic understanding. This summary is not an extensive overview of the disclosure and is neither intended to identify certain elements of the disclosure nor to delineate scope thereof. Rather, the primary purpose of this summary is to present some concepts of the disclosure in a simplified form prior to the more detailed description that is presented hereinafter.

In one disclosed aspect, a system for generating a device management profile comprises: at least one multi-function device comprising a processor and non-transitory storage medium, the at least one multi-function device in data communication with an associated computer network; a management tool for operating the at least one multifunction device via the associated computer network; a semantic query certification tool communicatively coupled to the associated computer network, the semantic query certification tool in data communication with the at least one multi-function device and the management application, wherein the semantic query certification tool is configured to initiate a high-level semantic operation; and a proxy logger communicatively positioned between and in network communication with the at least one multi-function device and the semantic query/certification tool, wherein the proxy logger is configured to record network communications directed to or sent from the at least one multi-function device corresponding to the high-level semantic operation.

In another disclosed aspect, a method for generating a device profile comprising at least one log file of protocol sequences associated with a specified operation of a multi-function device on a network comprises: sending an initiation data packet for the specified operation of a multi-function device to a proxy logger; recording a plurality of protocol sequences communicated over the network with a proxy logger, wherein the plurality of protocol sequences correspond to network communications required to perform the specified operation; executing the specified operation of the multi-function device over the network, wherein the plurality protocol sequences are communicated between the multi-function device and a device management application; communicating a conclusion data packet for the specified operation; and generating a log file of the plurality of protocol sequences recorded during the execution of the specified operation of the multi-function device.

In other disclosed aspects, a computer-implemented method for generating a device management profile comprising at least one log file of protocol sequences associated with a specified operation of a multifunction device on a network, the computer comprising a processor configured to perform a method comprises: communicating a first data packet associated with a specified semantic operation of a multi-function device; recording a plurality of protocol sequences communicated over the network, wherein the plurality of protocol sequences comprise data communions between a device controller and the multifunction device required to perform the specified operation; executing the specified semantic operation of the multi-function device over the network, wherein the plurality of protocol sequences are communicated between the multifunction device and the device controller, wherein the protocol sequences are recorded by the proxy logger; communicating a second data packet associated with the specified semantic operation, the second data packet instructing the proxy logger to stop recording protocol sequences; and generating a log of the plurality of protocol sequences associated with the specified operation of the multifunction device.

BRIEF DESCRIPTION OF THE DRAWINGS

The drawings are only for purposes of illustrating the preferred embodiments and are not to be construed as limiting the same.

DETAILED DESCRIPTION

As used herein, the singular forms "a," "an," and "the" include plural references unless the context clearly dictates otherwise. Unless defined otherwise, all technical and scientific terms used herein have the same meanings as commonly understood by one of ordinary skill in the art. Also, in this document, the term "comprising" means "including, but not limited to."

In this document, the term "connect" and its variants mean either a physical connection or a non-physical connection via which two devices may share data and/or instructions via signals sent via a wired or wireless communication protocol.

A protocol sequence is the language and order of communications that a network operating system uses to communicate over the network to other computers and devices. The protocol sequences required to accomplish a task usually vary between devices even when requested to perform identical high-level tasks. If a manager of a network system wishes to change what protocols of a device are enabled or the device's security settings, the order of communications (protocol sequences) determines the success of the specified task. In some cases, changing the security settings first might disable the protocol that is being used to communicate with the device. In that situation, the device itself may be rendered inoperable, as the communications to the device have been disabled. On the other hand, if the appropriate protocol is enabled so that the device is able to communicate over a couple of protocols and then the security mechanism is changed, communication with the device is still possible. The communication is possible via a channel that was enabled using the new security mechanism. Thus, when setting different objects in a device, there may be order dependencies between those objects such that the order in which settings are changed becomes important.

Often times, the protocol sequence for a specified task is unknown or hidden in vendor specific application tools (vendor software associated with a particular device). Thus, managing multiple devices on a network, especially where the multiple devices are sourced from different vendors, becomes difficult in that there is no single management tool that will manage each device since a "universal" management tool may not have the knowledge base to operate each device.

In a network environment, a device management application or tool, usually located within the computer of the network, communicates with a device, such as a multifunction device (MFD), through a communication protocol on the network. Generally, the communication protocol is a Simple Network Management Protocol (SNMP), however it may be web services, internet printing protocol, or other protocols used to manage an MFD. Said another way, the device management tool sends packets to the MFD (and vice versa) containing information related to the origination and destination of the packet as well as the sequence of protocols required to accomplish a specified task in a standard language. The task is generally a user-initiated task, using an input associated with the device management tool. While the order of operations are generally unknown, the communication language that carries the protocol sequences is usually a standard known language.

The subject disclosure describes a protocol semantics recognition system that may be deployed in constantly evolving, non-centralized environments, e.g., device management systems, operating systems, computer programs, file management systems, and the like. The system utilizes components located on the network to identify the beginning and ending of a semantic operation, for example, obtaining the number of monochrome pages that have been printed. Upon identification, a proxy logger records the protocols communicated over the network and obtains the protocol sequence associated with that specified semantic operation.

One or more embodiments will now be described with reference to the attached drawings, wherein like reference numerals are used to refer to like elements throughout.

Figure 1:
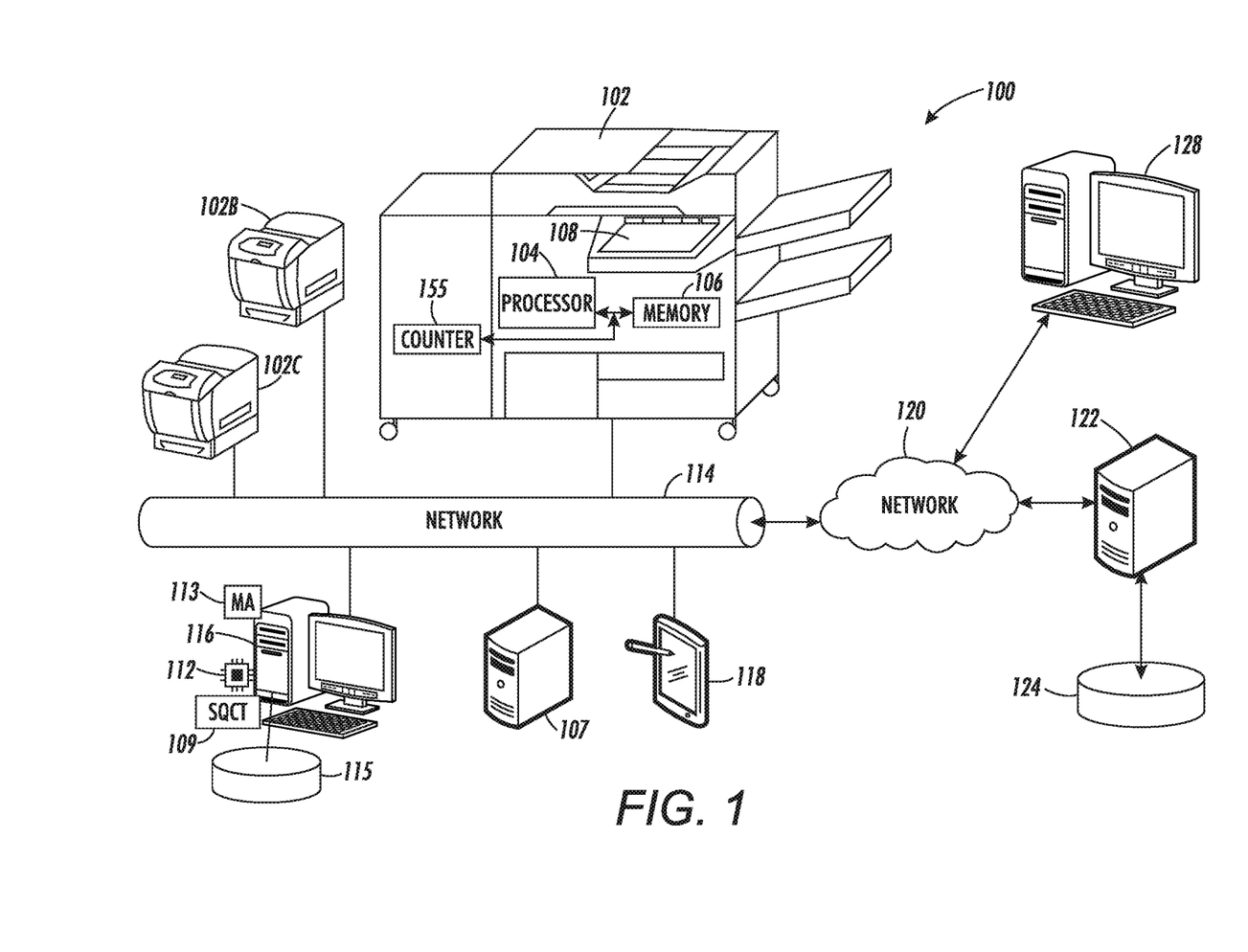
FIG. 1 diagrammatically illustrates various components of a system for acquiring protocol semantics of a multi-function device, including a multi-function device in accordance with one embodiment of the present disclosure.

Turning now to FIG. 1 there is shown an example system 100 including a multi-function device (MFD) 102A located on a network 114 that may be used in recognizing protocol semantics. In a network featuring multiple MFDs including MFD 102A, 102B and 102C, it is to be understood that each MFD102A, 102B and 102C of a multi-MFD network may communicate with other devices within the network 114 as similarly described in relation to the MFD 102A of FIG. 1. Each MFD within a multi-MFD network may be of similar or different manufacturer, model, or device. That it, it will be appreciated that the description of the MFD 102A and its operation is intended as an example MFD according to the subject embodiments, and is representative of the processes and components of the MFDs 102B and 102C depicted in FIG. 1. Accordingly, the skilled artisan will appreciate that MFDs 102B and 102C also include similar internal hardware as discussed with respect to the MFD 102A. Further, dependent upon type, manufacturer, and capability, the MFDs 102B and 102C may include additional components, as will be understood by a person having ordinary skill in the art. The multifunction device 102A, which is representative of any computing system that comprises at least a processor 104 that executes, and a memory 106 that stores computer-executable instructions for providing the various functions, calculations, selections, and the like, described herein. It will be appreciated that the multifunction device 102A, is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction device 102A is capable of being employed as one possible hardware configuration to support the systems and methods described herein. The skilled artisan will further appreciate that although the multifunction device 102A is illustrated as a standalone document-processing device, any suitable computing environment is capable of being employed in accordance with the subject application. For example, computing architectures including, but not limited to, multiprocessor, distributed, client/server, tablet, mainframe, supercomputer, digital and analog may be employed in accordance with the one embodiment of the subject application. It will further be appreciated that the multifunction device 102A may include a computer server, workstation, personal computer, combination thereof, or any other computing device.

The MFD 102A may include a processing unit 104, a system memory 106, and a system bus that couples various system components including the system memory 106 to the processing unit 104. The processing unit 104 may be any of various commercially available processors. The processing unit 104 may be variously embodied, such as by a single-core processor, a dual-core processor (or more generally by a multiple-core processor), a digital processor and cooperating math coprocessor, a digital controller, or the like. In some embodiments, the processing unit 104, in addition to controlling the operation of the multifunction device 102A, executes instructions stored in memory 106 for performing the methods outlined more fully below.

The MFD 102A typically includes at least some form of computer readable media. Computer readable media may be any available media that may be accessed by the multifunction device 102A. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above may also be included within the scope of computer readable media.

A user may enter commands and information into the MFD through an input device 108 such as a touch-screen interface, a keyboard, a pointing device such as a mouse or stylus, a speaker for audible alerts, a microphone for voice input, or a graphical tablet. The multifunction device 102A is capable of operating in a networked environment using logical and/or physical connections to one or more remote computers, such as a remote computer(s), depicted as the network 114 of FIG. 1. The logical connections depicted include a local area network (LAN) and a wide area network (WAN). Such networking environments are commonplace in offices, enterprise-wide computer networks, intranets and the Internet 120.

As discussed briefly above, the multifunction device 102A is in data communication with a computer network 114. As depicted in FIG. 1, user devices 116 and 118 are also in data communication with the computer network 114, and are capable of sending and receiving communications thereon to and from the multifunction device 102A. It will be appreciated that while illustrated in FIG. 1 as a personal computer 116 and a smart device 118, the user devices 116 and 118 are representative of any personal computing devices known in the art. It will be understood that any suitable device includes appropriate memory and an associated processor 112 for controlling interactions between any device coupled to the network 114. In addition to controlling the operations and interactions of the networked devices, such as MFD 102A, the associated processor 112 of the user device executes instructions stored in the appropriate memory for performing the methods fully outlined below.

The appropriate memory may be configured to store information relating to the MFD 102A or may host a database of information relating to protocol sequences for operating certain features of the MFD 102A. In a network including multiple MFD devices, the appropriate memory may be configured to store information relating to each MFD 102A or groups of MFDs 102A-C.

In one example embodiment, the network 114 is in communication with an external wide area network 120, such as, for example and without limitation, the Internet. Via the connection to the external network 120, the multifunction device 102 may be in communication with the server 122. According to such an example embodiment, the server 122 is associated with a service provider, technician, supplier, or the like. The server 122 may be operatively connected to a data storage device 124. According to one embodiment, the data storage device 124 is any mass storage device known in the art including, for example and without limitation, magnetic storage drives, a hard disk drive, optical storage devices, flash memory devices, or any suitable combination thereof. It will be appreciated that while illustrated in FIG. 1 as being a separate component of the system 100, the data storage device 124 is capable of being implemented as an internal storage component of the server 122, such as, for example and without limitation, an internal hard disk drive, or the like.

It will be appreciated that the server 122 may include any hardware, software, or combinations thereof, capable of implementing the systems and methods described herein. Suitable examples of such hardware includes, for example and without limitation, processors, hard disk drives, volatile and nonvolatile memory, a system bus, user interface components, display components, and the like. It will further be appreciated that multiple such devices may be used as the server 122 in accordance with the subject application.

An operator may manage devices, such as MFD 102A, on the network 114 via a management application 113. The management application 113 may be loaded onto a user device 116 of the network 114, such that the operator of a network 114 may use the management application 113 to control and manage each device 102A-C on the network 114. User devices 116 and 118 may include, for example and without limitation personal computer 116, smart device 118, and others. It is to be appreciated that a computer separate from the network 114, such as another computer 128 with access to the local network 114 via external network 120 may host a device management application 113 and control devices on local network 114, remotely.

The management application 113 may be software, hardware, or a suitable combination thereof, capable of performing any function of controlling any aspect of a MFD 102A. In other words, the management application 113 may enable or disable protocols, enable or disable a service such as printing, copying, scanning, obtain the count for a particular function, and the like. The management application 113 may also set a password for a particular service, or an operator may set or acquire information regarding the work that has been performed by an MFD 102A. For example, and without limitation, such information may correspond to the number of color prints or monochromatic prints produced by the particular MFD 102A. In such an exemplary instance, the MFD 102A may employ internal counters 155 which may collect and store such information for access by the aforementioned management application 113. While certain functions and settings are described above, it is to be understood that these functions are not limiting and the management application may indeed control any function or aspect of any device. In some embodiments, the management application 113 may be a vendor specific application, that is, it is associated with a particular device manufacturer. In other embodiments, the management application 113 may be a "universal" application able to control at least one device no matter the manufacturer or model of such device.

Generally, settings of the MFD 102 may be modified through a user device such as the personal computer 116 hosting the management application 113. That is, in one embodiment, the MFD 102A may receive system commands that operate functions and settings of the MFD 102A. System commands may be entered by a network operator via a user interface 111, 118 which may include without limitation, a keyboard 11, a touch-screen-enabled display screen device 118 for receiving input from a user, a mouse, trackball, and the like. As noted before, complexities arise when a network 114 includes multiple MFDs 102A, 102B, and 102C, wherein each MFD 102A, 102B, and 102C may be a different manufacturer or model devices and may each require a separate associated management application 113.

As illustrated in FIG. 1, the system 100 also includes a proxy logger 107 in data communication with the network 114. In in accordance with one embodiment of the subject implementation, the proxy logger 107 may be its own device communicatively coupled to the network 114. In other embodiments, the proxy logger 107 may be incorporated into a user device such as the personal computer 116 and smart device 118. That is, the proxy logger 107 may be an application hosted on such a user device 116, 118. In still other embodiments, the proxy logger 107 may be incorporated in the MFD 102A. In as much as the proxy logger 107 is constitutes software, the associated software of the proxy logger 107 may be a custom piece of software or an off the shelf component that supports extensions. That is, the proxy logger 107 is capable of customization in that desired features may be added to an existing computer program.

The proxy logger 107, while part of the network, may be understood as being communicatively placed between the MFD 102A and a user device, such as personal computer 116 or 118, that is hosting a management application 113. The proxy logger 107 is also in data communication with a semantic query/certification tool (SQCT) 109 which is explained in greater detail below.

The proxy logger 107, by nature of its placement, is configured to read all data communication sent from a device management application 113 to the MFD 102A via the network 114. In some embodiments, the proxy logger 107 operates in a promiscuous mode. Generally, in computer networking, a promiscuous mode is an operational mode of a network device that causes the device to pass all network traffic it receives rather than passing only the data packets that the device is specifically programmed to receive. Here, the proxy logger 107 passes all network traffic it receives and meanwhile, records and logs the network communications containing the protocol sequences that the proxy logger 107 passes or is otherwise able to acquire on the network.

Figure 2:
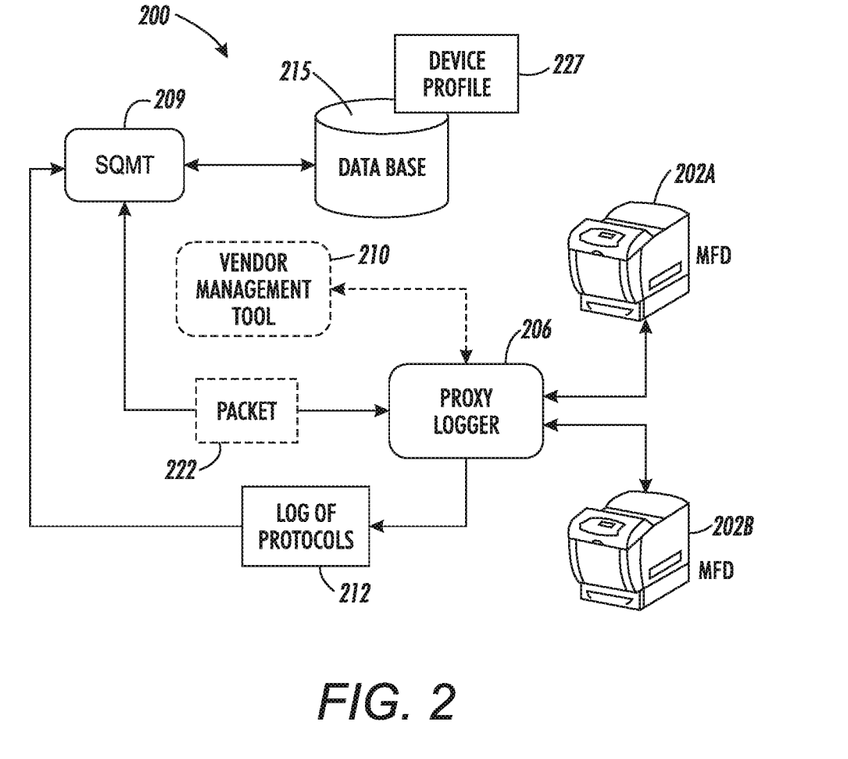
FIG. 2 diagrammatically illustrates a protocol semantics recognition system in accordance with one embodiment of the present disclosure.

In accordance with one exemplary embodiment, the proxy logger 107 may be implemented as a separate device or completely separate application e.g., an application resident on, for example and without limitation, a server, a router, a modem or other network connected device, as will be appreciated by the skilled artisan because it may also operate as a gateway. That is, in secure communications, a device management application 113 may connect to the proxy logger 107 via a secured connection and the proxy logger 107 will likewise; connect to an MFD 102A via a secured connection. In this way, communications sent along the communication path (via the network 214) remain encrypted and secure. However, when the communications are passing through the proxy logger 107 the data/protocol sequences may be decrypted by the proxy logger 107. In this way, the communications are logged then sent on to the MFD 102A. In some embodiments, the proxy logger 107 may log communications that originate from the MFD 102A.

As briefly mentioned above, the system also includes a SQCT 109. The SQCT 109 is capable of facilitating the implementation of the exemplary method described below, and may be integrated into a user device, such as personal computer 116, and in data communication with the MFD 102A, proxy logger 107 and personal computer 116. It is contemplated that the SQCT 109 may be integrated into other various user devices including but not limited to, a computer server, workstation, personal computer, laptop computer, cellular telephone, tablet computer, pager, combination thereof, or other computing device or group of networked devices capable of executing instructions for performing the exemplary method.

The user interface 111 of the user device, for example, of personal computer 116, may be used to input system commands or requests to the SQCT 109. While illustrated as a computer keyboard, the a user interface 111 may also include a touch-screen-enabled display screen device for receiving input, such as that of user device 118.

Generally, the SQCT 109 sends data packets to the proxy logger 107 that mark the initiation and conclusion of a high-level semantic operation. The SQCT 109 is also capable of receiving a log file 212 (shown in detail in FIG. 4) generated by the proxy logger 107 and cooperatively generate a device profile of the MFD 102A. In some embodiments, the SQCT 109 may be a piece of software, hardware, or combination of software and hardware. In other embodiments, the SQCT 109 may be used as a standalone piece or used in concert with third-party software, hardware, of combinations of hardware and software, for example and without limitation a third-party management application. In some embodiments, the SQCT 109 includes a management application 113 hosted on a personal computer 116 that is coupled to the network 114 and in communication with the MFD 102A. That is, the SQCT 109 itself may perform the functions otherwise described as performed by a management application 113.

The system 100 uses a "man in the middle" approach to record the protocol sequences required to perform a specified task. That is, the proxy logger 107 acts as a proxy or a gateway between the SQCT 109 and the MFD 102A.

Figure 4:
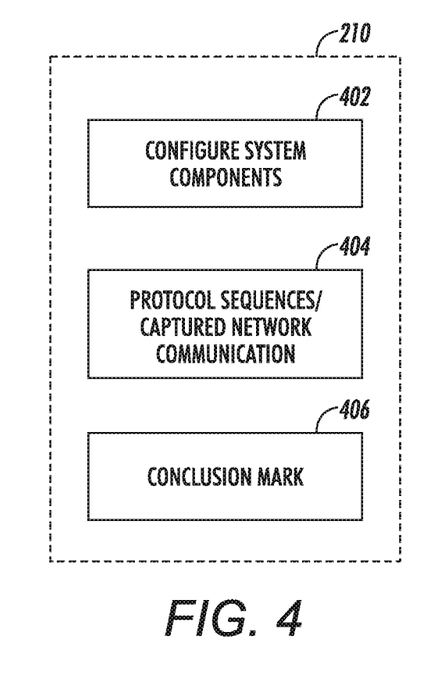
FIG. 4 diagrammatically illustrates the contents of a log file in accordance with one exemplary embodiment of the present disclosure.

With reference to FIGS. 2 and 4, in operation, the SQCT 209, is capable of sending data packets 222 to the proxy logger 206 to both initiate and conclude a data logging sequence performed by the proxy logger 206. In some embodiments, the SQCT 209 may specify the beginning of a semantic operation by sending a first data packet 222 the proxy logger 207. This first data packet may also be referred to as an initiation data packet that "initiates" and marks the beginning of a specified semantic operation.

The proxy logger 207 begins creating a log file 212 corresponding to the specified semantic operation. That is, the initiation packet 222 is logged as an initiation mark 402 within the log file 212. As a non-limiting exemplary example, one such semantic operation includes disabling the primary front Universal Serial Bus (USB) port.

The SQCT 209, may also specify the conclusion of a semantic operation by sending a second data packet 222 to the proxy logger 207. This second data packet may also be referred to as a conclusion data packet that "concludes" i.e. ends, a semantic operation. The conclusion data packet is associated with a conclusion mark 406 in the log file 212 as illustrated in FIG. 4.

In between the initiation mark 402 and the conclusion mark 406, the specific network requests and responses associated with the protocol sequences 404 (communications) are recorded and logged by the proxy logger 207. Stated another way, the communications 404 between the management application (either, 113, 209 or 210) and MFD 202A are framed by the initiation 402 and conclusion 406 marks of the semantic operation within the log file 212.

The proxy logger 207 is assigned the duty of generating a log file 212 of the network communications associated with the specified high-level semantic operation which is send to the SQCT 209 for additional processing. The log file 212 contains the initiation 402 and conclusion marks 406 as well as the record of the sequence of network requests and associated responses 404 that correspond to the specified high-level semantic operation. The log file 212 is sent to and received by the SQCT 209. The SQCT 209 may then store the log file 212 within an associated database 215.

Figure 3:
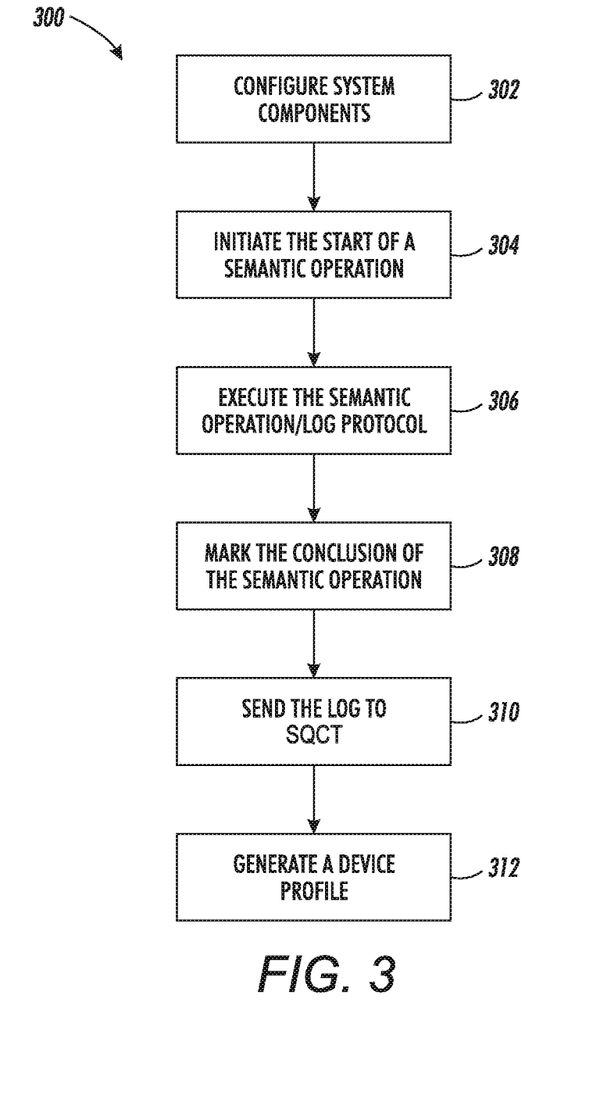
FIG. 3 is a flow chart illustrating a protocol method in accordance with one embodiment of the present disclosure.

Referring now to FIG. 3, there is shown a functional flow chart of a method for obtaining protocol sequences 300 utilizing the systems of FIGS. 1 and 2, in accordance with an example embodiment of the subject disclosure. In some embodiments, the method 300 begins by configuring the system components 302. This may be done with via the user device 116 or 118 in data communication with the network 114. In some embodiments, an MFD, such as the MFD 102A of FIG. 1, may have an integrated user interface 108, processor 104, and memory 106, that is capable of configuring the MFD 102A to the network 114, user devices 116 and 118 and proxy logger 107. That is the proxy logger 107 is configured as a passive device operating in a promiscuous mode or as an active participant wherein the communication over the network 114 and channels are encrypted.

With reference back to FIG. 2, in a promiscuous mode, the proxy logger 207 is able to see any traffic going to any device (e.g. MFDs 102A-C) on the network 114. This requires that the network communications are either unencrypted or encrypted in such a way that the network communications may be decrypted.

As an active participant in the network 214, the SQCT 209 is configured to utilize the proxy logger 207 as a proxy/gateway to communicate with the MFD 202A. At the same time, the MFD 202A is configured to communicate with and use the proxy logger 207. This configuration is usually needed when the network encryption mechanism requires the proxy logger 207 to be an active participant in the communication channel.

The SQCT 209 is further configured to use a database 215 to store its output while the proxy logger 207 is configured to store its output (log file 212) on a location accessible to the SQCT 209. In some embodiments, the information stored within the database 215 may be accessible by any device on the network 114.

Once configured at 302, an operator of the SQCT 209 enters information that identifies a high-level semantic operation. That is, a specific operation related to a function or setting of at least one MFD 202A, 202B located on the network 214 is selected. It is to be appreciated that the network 214 may include multiple MFDs 202A, 202B and the operator may select a specific operation related to one or more MFDs 202A, 202B in data communication with the network 214.

The SQCT 209 sends a data packet 222 along the network 214 containing information regarding the high-level semantic operation to be performed and the identity of one or more targeted MFDs 202A, 202B. The data packet 222 is a data transmission originating from the SQCT 209 and intended to be received by the proxy logger 207. That is, the data packet 222 is generally ignored by the MFD 202A but is captured by the proxy logger 207. The data packet 222 may be an initiation data packet that includes instructions to the proxy logger 207 telling the proxy logger 207 to begin recording network communications. The data packet 222 may also contain information about the selected operation. For example, a data packet used to initiate a high-level semantic operation may include the instructions "begin" and "enable LPR" (line printer). The proxy logger 207 begins to create a log file 212 of the specified semantic operation for at least one MFD 202A 202B, wherein the log file 212 includes an initiation mark 402 corresponding to the data contained within the first data packet sent by the SQCT 209.

Once initiated 304, the specified semantic operation will be executed at 306. That is, after the initiation of the operation, the protocol sequences that are necessary to perform the specified operation/task, are communicated over the network 114. While the specified task is being performed, the proxy logger 207 logs network communications between the management application and the MFD 202A, wherein the management application (113 of FIG. 1) is part of the SQCT 209 or is a separate management application 210.

The specified operation is executed at 306 by the management application 210. In some embodiments, as indicated above, a management application 210 is integrated into the SQCT 209. That is, the SQCT 209 exchanges protocol sequences with the MFD 202A through the proxy logger 207 in order to accomplish a high-level specified operation. In other embodiments, the management application 210 is a 3rd party tool or $3^{rd}$ party management application, separate from the SQCT 209. In such an embodiment, while the SQCT 209 initiates the proxy logger 207, it is the management application 210 that exchanges communications with an MFD 202 through the proxy logger 207 to perform the specified task. In still other embodiments, management application 210 is a 3<sup>rd</sup> party vendor management tool that is generally supplied and associated with a particular MFD 202A, 202B or brand of multifunction device.

After the operation is executed and performed at 306, the Semantic Query/Certification tool 209 enters the results of the high-level semantic operation. That is, the SQCT 209 sends a data packet 222 along the network 214. The second data packet is a conclusion data packet transmission originating from the SQCT 209. This second data packet is generally ignored by the MFD 202 but is captured by the proxy logger 207. The conclusion packet may include instructions to the proxy logger 207 telling the proxy logger 207 to cease recording network communications. The proxy logger 207 completes the log file 212 of the specified semantic operation for at least one MFD. The log file 212 includes a conclusion mark 406 corresponding to the second data packet sent by the SQCT 209. In some embodiments, an operator of the SQCT 209 at 308 enters information via a user interface that indicates the conclusion of the high-level semantic operation.

At this point in the method 300, the proxy logger 207 identified and captured/logged an initiation packet associated with the start of the semantic operation, protocol sequences/network communications associated with performing the semantic operation, and a conclusion packet marking the end of the operation. In other words, the protocol sequences for a task are packaged between initiation and conclusion marks, 402 and 406, respectively.

Once the data packet 222 marking the end of the semantic operation is sent to the proxy logger 207, the proxy logger 207 at 310 sends the log file 212 to the SQCT 209. The log file 212 contains the recorded/logged protocol sequences 404 captured with the initiation (beginning) mark 402 and conclusion (ending) mark 406.

Once the SQCT 209 receives the log file 212 the SQCT 209 may generate or update a device profile 227 at 310 for the MFD 202 associated with the specified high-level task. The SQCT 209 may process log file 212 to create a device profile 227 for an MFD 202 on the network 214 in a format to be consumed by automation. That is, the automation will replay the sequence of protocol messages that are needed to do the semantic task. The processing may replace all the specific information with general tags that have to be filled in when replayed to do the task, e.g., ip addresses, authorizations, etc. The SQCT 202A may then store the log file 212 and/or created device profile 227 in the database 215.

The exemplary systems and methods disclosed herein are able to mine the knowledge base embedded in third-party tools 210 that implement high level semantic operations. The systems and methods advantageously define starting and ending communication marks and capture standard network protocols in between. In other words, no modification of a third-party vender management tool 210 is required.

It is to be understood, that high-level semantic operations may correspond to any protocol in the MFD 202. The MFD 202 is managed by a management application 210 executed by an associated processor/controller 112 or other suitable component to perform any function or control any aspect of a multifunction device 202. In other words, the management application 210 may enable or disable protocols, enable or disable a service such as printing, copying, scanning, obtain the count for a particular function, and/or the like. The management application 210 may set a password for a particular serve, or operator may set or acquiring the counters of the work that has been performed by an MFD.

Each semantic operation captured within a log file 212 may be used to generate a device profile 227 for a particular MFD 202. That is, a device profile 227 is generated based upon a compilation of a plurality of log files 212. The advantage is that a device profile 227 for a particular machine may be propagated for use to other similar MFDs 202A, 202B. For example, a device profile 227 including log files 212 for a manufacturer X, model Y MFD, may be propagated to other printers on the network of the same manufacturer X and Model Y. In some cases, the device profile may be compatible with multiple devices of the same manufacturer. Continuing with the example, a device profile 227 for a manufacturer X and model Y may also be compatible with a manufacturer X model Z MFD.

With continued reference to FIG. 2, a device profile 227 may be located within storage/database 215 and associated with a particular MFD 202A. The device profile 227 may be used by the SQCT 209 or the management application 210 with access to the device profile 227. Such management application 210 may be located within a network cloud (not shown). The management application 210 may then use the device profile 227 and more specifically, the protocol sequences associated with specified tasks to operate or control the functions and settings of at least one MFD 202.

The device profile 227 of one MFD 202A may be used to operate functions of that MFD 202A. The contents of the device profile 227 may also be propagated as a second device profile associated with another MFD 202B. That is, the device profile 227 may be used to issue commands for multiple MFDs 202A, 202B or the device profile 227 for a first MFD 202A may be copied and the copy thereafter associated with a second MFD 202B. Once the protocol sequences for one make/model/version of an MFD is captured, that information is going to be pushed out to any management application 210 that is responsible for managing that type of make/model/version (or otherwise compatible) MFD 202. 202, 202(b).

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer may read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. § 112(f) unless the words "means for" or "step for" are explicitly used in the particular claim.

What is claimed is:

1. A system for generating a device management profile comprising:
    at least one multi-function device comprising a processor and non-transitory storage medium, the at least one multi-function device in data communication with an associated computer network;
    a management tool for operating the at least one multi-function device via the associated computer network;
    a semantic query certification tool communicatively coupled to the associated computer network, the semantic query certification tool in data communication with the at least one multi-function device and the management tool, wherein the semantic query certification tool is configured to initiate a high-level semantic operation; and
    a proxy logger communicatively positioned between and in network communication with the at least one multi-function device and the semantic query/certification tool,
        wherein the semantic query/certification tool is configured to send an initiation packet and a conclusion packet along the computer network readable by the proxy logger;
        wherein the proxy logger is configured to record network communications directed to or sent from the at least one multi-function device corresponding to the high-level semantic operation;
        wherein the proxy logger generates a log file associated with the high-level semantic operation of the multi-function device, the log file comprising:
            an initiation mark;
            recorded communications between the management tool and the multi-function device; and
            a conclusion mark.

2. The system according to claim 1 further comprising a user device coupled to the computer network, the user device comprising a processor and non-transitory storage medium configured to host and execute the management tool.

3. The system according to claim 1 further comprising a user device coupled to the computer network, the user device comprising a processor and non-transitory storage medium configured to host and execute instruction of the semantic query certification tool.

4. The system according to claim 1, wherein the management tool is integrated into the semantic query/certification tool.

5. The system according to claim 1, wherein the proxy logger is configured to send the log file to the semantic query/certification tool for further processing, and wherein the semantic query/certification tool stores the log file in an associated database.

6. A method for generating a device profile comprising at least one log file of protocol sequences associated with a specified operation of a multifunction device on a network comprising:
   sending an initiation data packet for the specified operation of a multi-function device to a proxy logger;
   recording a plurality of protocol sequences communicated over the network with a proxy logger, wherein the plurality of protocol sequences correspond to network communications required to perform the specified operation;
   executing the specified operation of the multi-function device over the network, wherein the plurality protocol sequences are communicated between the multi-function device and a device management application;
   communicating a conclusion data packet for the specified operation; and
   generating a log file of the plurality of protocol sequences recorded during the execution of the specified operation of the multi-function device;
   wherein the log file comprises:
      an initiation mark corresponding to the proxy logger receiving the initiation signal;
      a conclusion mark corresponding to the proxy logger receiving the conclusion signal; and
      the protocol sequences associated with network communications between a device controller and the multi-function device required to perform the specified operation of the multifunction device.

7. The method according to claim 6, wherein the initiation data packet is sent from a semantic query/certification tool in network communication with the proxy logger and the multi-function device to the proxy logger.

8. The method according to claim 6, wherein the conclusion data packet is sent from a semantic query/certification tool in network communication with the proxy logger and the multi-function device to the proxy logger.

9. The method according to claim 6, wherein the proxy logger is further configured to decrypt a secured protocol sequence.

10. The method according to claim 6, wherein the proxy logger operates in a promiscuous mode in the network.

11. The method according to claim 6, wherein the proxy logger is an active participant in network communications between a device controller and multi-function device.

12. The method according to claim 6, the method further comprising sending the log of protocol sequences to a semantic query/certification tool for processing, the processing comprising generating a device profile for the multifunction device.

13. The method according to claim 6, wherein the generated device profile is propagated to operate a different multi-function device located on the network.

14. A computer-implemented method for generating a device management profile comprising at least one log file of protocol sequences associated with a specified operation of a multifunction device on a network, the computer comprising a processor configured to perform a method comprising:
   communicating a first data packet associated with a specified semantic operation of a multi-function device;
   recording a plurality of protocol sequences communicated over the network, wherein the plurality of protocol sequences comprise data communions between a device controller and the multifunction device required to perform the specified operation;
   executing the specified semantic operation of the multi-function device over the network, wherein the plurality of protocol sequences are communicated between the multifunction device and the device controller, wherein the protocol sequences are recorded by a proxy logger;
   communicating a second data packet associated with the specified semantic operation, the second data packet instructing the proxy logger to stop recording protocol sequences; and
   generating a log of the plurality of protocol sequences associated with the specified operation of the multi-function device;
      wherein the at least one log file comprises:
         an initiation mark corresponding to the proxy logger receiving the initiation signal;
         a conclusion mark corresponding to the proxy logger receiving the conclusion signal; and
         the protocol sequences associated with network communications between the device controller and the multi-function device required to perform the specified operation of the multifunction device.

15. The method according to claim 14, wherein the initiation data packet and the conclusion data packets are sent from a semantic query/certification tool in network communication with the proxy logger and the multi-function device to the proxy logger.

16. The method according to claim 14, wherein the generated device profile is propagated to operate a different multi-function device coupled to the network.

* * * * *